United States Patent [19]

Fink et al.

[11] Patent Number: 4,576,860

[45] Date of Patent: Mar. 18, 1986

[54] FOAM LAMINATE FOIL OR WEB AND PROCESS FOR PREPARING SAME

[75] Inventors: Roland Fink, Ebenhausen; Maximilian Mayr, Garching; Dieter Schlenz, Egling, all of Fed. Rep. of Germany

[73] Assignee: Alkor GmbH Kunststoffe, Munich, Fed. Rep. of Germany

[21] Appl. No.: 764,577

[22] Filed: Aug. 12, 1985

[30] Foreign Application Priority Data

Aug. 10, 1984 [DE] Fed. Rep. of Germany ....... 3429523

[51] Int. Cl.$^4$ .......................... B32B 3/26; B32B 27/08
[52] U.S. Cl. .................... 428/314.4; 156/196; 156/222; 264/321; 428/317.7; 428/319.7
[58] Field of Search ............... 428/314.4, 314.8, 317.1, 428/317.7, 319.7, 319.9

[56] References Cited

U.S. PATENT DOCUMENTS 3,861,994  1/1975  Stark ................................ 428/314.8
3,911,190  10/1975  Myers et al. ..................... 428/314.4
4,278,629  7/1981  Bennett ............................ 428/319.7

Primary Examiner—William J. Van Balen
Attorney, Agent, or Firm—Schwartz, Jeffery, Schwaab, Mack, Blumenthal & Evans

[57] ABSTRACT

A foam laminate foil or web and process therefor. The laminate includes an unfoamed top layer containing an elastomer grafted styrene-acrylonitrile copolymer (ASA), grafted with polyfunctional acrylates and a chlorinated polyethylene (PEC) and/or a rubber-like ethylene-propylene mixed polymer (EPM) and/or a rubber-like terpolymer of ethylene, propylene and a diene, a closed pore polyolefin bottom layer with a bulk density of 30 kg/m$^3$ to 700 kg/m$^3$ which includes an ethylene homo- or copolymer, and an intermediate layer arranged between the bottom layer and the top layer and which acts as a coupling agent. The intermediate layer includes a low pressure polyethylene, an ethylene-vinyl ester copolymer and a rubber-like ethylene-propylene mixed polymer (EPM) and/or a rubber-like terpolymer of ethylene, propylene and a diene (EPDM).

30 Claims, 1 Drawing Figure

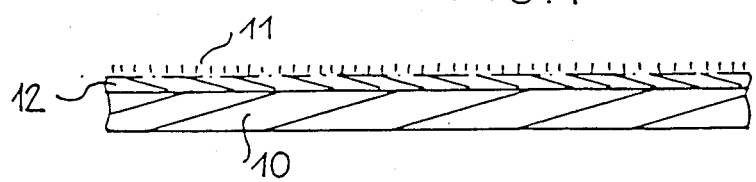

FOAM LAMINATE FOIL OR WEB AND PROCESS FOR PREPARING SAME

BACKGROUND OF THE INVENTION

The present invention relates to a foam laminate foil or web, which includes a polyolefin foam foil or layer (top layer) (bottom layer), a nonfoam top foil or nonfoam surface layer, containing a mixture or alloy of an elastomer grafted styrene-acrylonitrile copolymers (ASA) in a certain weight proportion, together with an intermediate foil or layer arranged between the polyolefin foam bottom layer and the top layer, the intermediate layer prepared from at least one low pressure polyethylene and an ethylene vinyl ester copolymer or terpolymer.

In German Offenlegungsschrift No. 27 21 532 a process for the preparation of composite foam foils is disclosed, wherein an unfoamed synthetic plastic layer (B) consisting of a 20 $\mu$m–5mm thick layer, is applied to a foamed synthetic plastic layer (A) consisting of a 1–120 mm thick foamed plastic web of an ethylene homo- or copolymer and having a density between 10 g/l and 200 g/l. The layers are joined together by means of a compacting pressure, or else the layers (A) and (B) are adhesively joined by the use of a coupling agent coextruded with the unfoamed synthetic plastic layer (B). The synthetic materials for the unfoamed layer (B) are ethylene polymers. Other usable synthetic materials are styrene polymers, such as for example polystyrene, copolymers of styrene with the usual comonomers, such as acrylonitrile, acryl esters or maleic ester anhydride, which may be modified optionally by rubbers based on butadiene or acryl ester polymers; also homo- or copolymers of propylene, methylmethacrylate, vinyl chloride or vinylidene chloride. Thermoplastic polycondensates and polyadducts may also be used, such as for example polyamides, linear polyesters, polyacetates or polycarbonates.

Foam laminate foils, prepared by the process of German Offenlegungsschrift No. 27 21 532, comprise a polyethylene foam, an unfoamed layer or foil of a styrene-acrylonitrile copolymer and an intermediate layer of polyvinylacetate, but pose the risk of delamination at elevated temperatures, and thus the adhesion of the individual layers to each other is inadequate for many applications.

Such delamination is particularly apparent in the 6–36 hour thermal aging test of molded parts at 120° C., by the separation of the top foil as the result of shrinkage phenomena from the polethylene foam. As the layers of th coupling agents in most cases have lower physical properties than the surface foil and the PE foam, they affect the properties of the composite detrimentally if used in the form of a heavier layer.

SUMMARY OF THE INVENTION

It is an object of the present invention to avoid the aforementioned disadvantages by providing a foam laminate foil or web with improved properties.

It is another object of the invention to provide a foam laminate foil or web which combines the specific properties of the styrene polymers, particularly their good hot formability, grain stability and agreeable feel, with the typical properties of the polyolefins, without incurring the danger of delamination or a deterioration of their deformation behavior.

Still another object of the invention is to provide a process for preparing the above-described foam laminate.

These objects are achieved by a delamination resistant foam laminate, comprising an unfoamed top layer having a thickness of greater than about 20 $\mu$m and comprising a styrene-acrylonitrile copolymer grafted with at least one polyfunctional acrylate and containing at least one additional polymer selected from the group consisting of chlorinated polyethylenes, ethylene-propylene mixed polymers and a terpolymer of ethylene, propylene and a diene, the weight ratio of the grafted styrene-acrylonitrile copolymer to the additional polymer or polymers being from about 8:2 to about 3:7; a polyolefin foam bottom layer comprising at least one polymer selected from the group consisting of closed pore polyethylene foams and closed pore ethylene-propylene copolymer foams, the bulk density of the bottom layer being greater than 10 kg/m$^3$; and an intermediate layer arranged between the top and bottom layers and acting as a coupling agent, the intermediate layer comprising a mixture of a polar group-containing low pressure polyethylene, a polar group-containing ethylene-vinyl ester copolymer and at least one additional polymer selected from the group consisting of rubber-like ethylene-propylene mixed polymers and rubber-like terpolymers of ethylene, propylene and a diene.

The objects of the invention are also achieved by a process for preparing the above foam laminate, which includes the steps of joining the top, bottom and intermediate layers using joining means selected from the group consisting of pressing, rolling, coextrusion and combinations thereof. The laminate is heated during the joining step.

BRIEF DESCRIPTION OF THE DRAWINGS

FIG. 1 illustrates an embodiment of the laminate of the invention.

DETAILED DESCRIPTION OF THE PREFERRED EMBODIMENT

The invention relates to a foam laminate foil wherein the top foil or surface layer composed of a mixture or alloy of an elastomer grafted styrene-acrylonitrile copolymer (ASA) grafted with polyfunctional, preferably difunctional acrylates and a chlorinated polyethylene (PEC) and/or a rubber-like ethylene-propylene mixed polymer (EPM) and/or a rubber-like terpolymer of ethylene, propylene and a diene, preferably a nonconjugated diene (EPDM), wherein the weight proportions (ASA) to (PEC) and/or (EPM) and/or (EPDM) amount to 8:2 to 3:7, preferably 6:4 to 4:6. The polyolefin foam foil or layer (bottom foil) comprises a closed pore polyethylene foam and/or a closed pore ethylene-propylene copolymer foam or mixtures of these synthetic materials, with a bulk density of 30 to 700 kg/m$^3$, preferably 35 to 500 kg/m$^3$. The intermediate foil or intermediate layer comprises a mixture or alloy of a mixture or alloy containing polar groups of a low pressure polyethylene containing polar groups and an ethylene-vinyl ester copolymer containing polar groups, preferably an ethylene-vinyl acetate modified low pressure polyethylene (HDPE), and a rubber-like ethylene-propylene mixed polymer (EPM) and/or a rubber like terpolymer of ethylene, propylene and a diene (EPDM).

FIG. 1 illustrates an example of an embodiment of the invention in a schematic view. The top foil (11) is joined by means of the intermediate layer (12) to the polyolefin foam foil or layer (10) (representing the bottom layer or foil).

The foam laminate foil or web according to the invention has good hot formability, a slight change in embossed patterns due to heating to forming temperatures, low hardening of the laminate during deformation, good aging behavior, no delamination during processing and application and further processing advantages and improved properties of the product.

The intermediate foil is adapted according to the invention in its hot forming stability, its mechancial properties and deep drawing behavior to the top foil. In this manner, the typical properties of the styrene polymers may be combined with those of the polyolefins. As specific properties of styrene polymers, good hot formability, grain stability and agreeable feel are mentioned. The modified polyolefins in particular improve low temperature properties.

As the mechanical properties of the intermediate foil are adapted to those of the surface foil, their thickness proportions may be varied within a wide range. However, the thickness ratio between the top foil or surface layer and the intermediate layer appropriately amounts to 4:1 to 1:4, preferably 3:1 to 1:3.

According to a preferred embodiment, the weight proportion in the top foil or surface layer of chlorinated polyethylene (PEC) to the rubber-like terpolymer of ethylene, propylene and a diene (EPDM) and/or to the rubber-like ethylene-propylene mixed polymer (EPM) amounts to 1:3 to 3:1, preferably 1:2 to 2:1. In the intermediate layer, the vinyl ester content (with respect to the entire mixture or alloy of synthetic substances of the intermediate layer), preferably the vinyl acetate content (or vinyl acetate unit content) amounts to 5-20 parts by weight, preferably 6-18 parts by weight (with respect to 100 parts by weight of the mixture or alloy of synthetic substances and calculated without auxiliary processing means, fillers or additives). With the use of this composition it is possible, among other things, to reduce or eliminate the risk of delamination.

According to a preferred embodiment, the EPM and/or EPDM content in the intermediate layer is from about 6 to about 27 parts by weight, preferably 7-24 parts by weight, (with respect to 100 parts by weight of the synthetic material mixture or alloy of the intermediate layer and calculated without processing aids, fillers or additives). With this composition of the foam laminate foils an especially low hardening of the laminate after deformation, and a reduction of the danger of delamination and the like, are obtained. The ethylene-vinyl ester copolymers containing polar groups and used for the intermediate layer are preferably ethylene-vinyl acetate copolymers, and have a vinyl ester, preferably a vinyl acetate content (vinyl acetate unit content) of 9-40% by weight, preferably 12-30% by weight.

The chlorinated polyethylene (PEC) contained according to one embodiment in the top foil or surface layer preferably has a chlorine content of 36-46% by weight. The top foil or surface layer contains according to a further embodiment, 0.5-5% by weight, preferably 2-4% by weight (with respect to 100% by weight of the synthetic substance mixture of the top foil) of a polycaprolactone. The closed pore polyethylene foam and/or closed pore ethylene-propylene copolymer foam or closed pore foam of mixtures of these synthetic substances is not crosslinked and has a bulk density of 300-700 kg/m$^3$, preferably 320-500 kg/m$^3$.

According to a still further embodiment, the closed pore polyethylene foam is cross-linked by a physical and/or chemical process known per se and/or the closed pore ethylene-propylene copolymer foam is cross-linked and has a bulk density of 30-300 kg/m$^3$, preferably 35-280 kg/m$^3$. The intermediate foil or intermediate layer and the top foil or surface layer have a total thickness of 0.1-1.5 mm, preferably 0.3-0.8 mm. The polar group-containing ethylene-vinyl acetate copolymer has a melting index Mfi 190/2.16 of 1-10 g/10 min.

The invention further concerns a process for the preparation of the above described foam laminate foils or webs. The layers are joined or bonded together, without the use of additional adhesives, by pressing in known pressing or rolling installations and/or by the use of a coextrusion process with the application of heat.

The surface layer exiting from a sheet die and the intermediate layer are combined without the use of additional adhesives at a mass temperature of 180° C. to 260° C., preferably 200° C. to 240° C., with the poyolefin foam foil or web at a line pressure of 2 to 50 kp/cm, with the use of at least one pair of rolls, preferably using an embossing roll or a press.

According to a further embodiment, the top foils and/or bottom foils and/or intermediate foils are prepared separately and/or in the form of two-layer foils and joined by means of a press or at least one pair of rolls, with the other foils or the third foil at an intermediate temperature of 130°-250° C., preferably 140°-190° C., by pressing without the use of additional adhesives.

According to another preferred embodiment, the top layer, bottom layer and intermediate layer are joined by coextrusion at a mass temperature of 180°-260° C., preferably 200°-240° C. and produced by means of a sheet die.

The foam laminate foils or webs according to the invention may be applied directly as such or they may be exposed to further working or processing, for example, hot deformation, deep drawing or embossing and/or secondary foaming, or the like.

The foils according to the invention are adapted in regard to their thermoforming stability, their mechanical properties and deep drawing behavior, to the top foil. In this manner, the typical properties of styrene may be combined advantageously with those of polyolefins. As particular properties of styrene polymers, good thermoformabilty, grain stability and agreeable feel may be mentioned. Modified polyolefins improve in particular low temperature properties.

COMPARATIVE EXAMPLE 1

The 300 μ m thick top foil consisted, in this comparative example which is not part of the prior art, or a mixture of 65 parts of weight of an acrylate grafted styrene-acrylonitrile copolymer (ASA)—acrylate proportion approx. 40% by weight, 25 parts by weight PEC—chlorine content 42%

10 parts by weight EPDM—ethylene content 70%, and was prepared by calendering at 180° C.

The intermediate layer consisted of HDPE Mfi 190/2.16 of 1 g/10 min, an ehtylene-vinyl acetate (EVA) copolymer with a proportion of 28% VAc and a Mfi 190/2.16 of 3 g/10 min, in mixing proportions according to the table below. The mixtures were extruded at 180° C. to 200 μ m thick foils.

The bottom layer consisted of a cross-linked HDPE foam with bulk density of 35 kg/m³.

The 3 layers were pressed in a press at 170° C. for 2 min with a pressure of 5 kg/cm².

The values listed in Table I were determined by the appropriate DIN (German Industrial Standard) testing methods.

TABLE I

| Phys. prop. | Mixing prop. HDPE/EVA | | | | |
|---|---|---|---|---|---|
| | 9:1 | 8:2 | 7:3 | 6:4 | 4:6 |
| Utl. tensile strength longitudinal, (N/mm²) | 21.5 | 17 | 15.5 | 15 | 13 |
| Utl. tensile strength transverse (N/mm²) | 21 | 16 | 15 | 15 | 14 |
| Elongation longitudinal (%) | 170 | 130 | 125 | 205 | 440 |
| Elongation transverse (%) | 260 | 105 | 140 | 185 | 360 |
| Shore D hardness | 64 | 60 | 57 | 55 | 53 |
| VSP (A) °C. | 132 | 115 | 112 | 89 | 77 |
| Adhesion (N/5 cm) | 5.9 | 12.5 | 27 | 30 min | 30 min unseparable |
| VAc content (% by weight) | 2.8 | 5.6 | 8.4 | 12.2 | 16.8 |

The tensile tests showed a limited compatibility of the two polymers, as the ultimate tensile strength declined with increasing proportions of EVA and the elongation was not improved. The vacuum deformation of the laminate was not adequate, as at temperatures above 120° C. the intermediate layer ruptured without a satisfactory deformation of the top foil. Adhesion in these combinations was adequate only beginning with a VAc proportion of 12% by weight.

EXAMPLE 1

In the intermediate layer according to Comparative Example 1, the HDPE was replaced in part by EPDM according to the invention, while otherwise following the process of Comparative Example 1. Results are compiled in Table II.

TABLE II

| Physical prop. | Mixing prop. HDPE/EPDM Eva | | | | |
|---|---|---|---|---|---|
| | 6.3:2.7:1 | 5.6:2.4:2 | 4.9:2.1:3 | 4.2:1.8:4 | 2.8:1.2:6 |
| Utl. tensile strength longitudinal, (N/mm²) | 19.5 | 19.2 | 18.5 | 18 | 18.3 |
| Utl. tensile strength transverse (N/mm²) | 19.2 | 19 | 18 | 17.8 | 18 |
| Elongation (%) | 870 | 860 | 830 | 845 | 855 |
| Elongation transverse (%) | 820 | 865 | 840 | 820 | 830 |
| Shore D hardness | 52 | 50 | 47 | 43 | 40 |
| VSP (A) °C. | 110 | 95 | 82 | 77 | 73 |
| Adhesion (N/5 cm) | 7.5 | 3.8 | unseparable | unseparable | unseparable |
| VAC content (% by weight) | 2.8 | 5.6 | 8.4 | 12.2 | 26.8 |

The results of tensile testing showed that the test results were independent of the mixing proportion and that therefore "practical" compatibility was present. Furthermore, the adhesion properties required were obtained already with a VAC content of 8.4%. Deep drawing tests indicated that deformations could be effected within a range of 120° to 160° C. and that satisfactory contours are thereby obtained.

The foregoing description of preferred embodiments has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A delamination resistant foam laminate, comprising:
   an unfoamed top layer having a thickness of greater than about 20 μm and comprising a styrene-acrylonitrile copolymer grafted with at least one polyfunctional acrylate and containing at least one additional polymer selected from the group consisting of chlorinated polyethylenes, ethylene-propylene mixed polymers and a terpolymer of ethylene, propylene and a diene, the weight ratio of said grafted styrene-acrylonitrile copolymer to said at least one additional polymer being from about 8:2 to about 3:7;
   a polyolefin foam bottom layer comprising at least one polymer selected from the group consisting of closed pore polyethylene foams and closed pore ethylene-propylene copolymer foams, the bulk density of said bottom layer being greater than 10 kg/m³; and
   an intermediate layer arranged between said top and bottom layers and acting as a coupling agent, said intermediate layer comprising a mixture of a polar group-containing low pressure polyethylene, a polar group-containing ethylene-vinly ester copolymer and at least one additional polymer selected from the group consisting of rubber-like ethylene-propylene mixed polymers and rubber-like terpolymers of ethylene, propylene and a diene.

2. A foam laminate according to claim 1, wherein said styrene-acrylonitrile copolymer of said top layer is grafted with a difunctional acrylate, and wherein said diene in said top layer is nonconjugated.

3. A foam laminate according to claim 1, wherein the weight ratio of said grafted styrene-acrylonitrile copolymer to said at least one additional polymer in said top layer is from about 6:4 to about 4:6.

4. A foam laminate according to claim 1 wherein the bulk density of said bottom layer is from about 30 to about 700 kg/m³.

5. A foam laminate according to claim 1 wherein the bulk density of said bottom layer is from about 35 to about 500 kg/m³.

6. A foam laminate according to claim 1 wherein said ethylene-vinyl ester copolymer of said intermediate layer is ethylene-vinyl acetate.

7. A foam laminate according to claim 6 wherein said ethylene-vinyl acetate copolymer has a melt flow index 190/2.16 of from about 1 to about 10 g/min.

8. A foam laminate according to claim 1, wherein the ratio thicknesses between said top layer and said intermediate layer is from about 4:1 to about 1:4.

9. A foam laminate according to claim 1, wherein the ratio thicknesses between said top layer and said intermediate layer is from about 3:1 to about 1:3.

10. A foam laminate according to claim 1 wherein said top layer contains at least two said additional polymers, one of said additional polymers being a chlorinated polyethylene, and wherein the ratio of said chlorinated polyethylene to the other said additional polymers is from about 1:3 to about 3:1.

11. A foam laminate according to claim 1 wherein said top layer contains at least two said additional polymers, one of said additional polymers being a chlorinated polyethylene, and wherein the ratio of said chlorinated polyethylene to the other said additional polymers is from about 1:2 to about 2:1.

12. A foam laminate according to claim 1 wherein the vinyl ester content in said ethylene-vinyl ester of said intermediate layer comprises from about 5 to about 20 parts by weight per 100 parts by weight of total polymer in said intermediate layer.

13. A foam laminate according to claim 1 wherein the vinyl ester content in said ethylene-vinyl ester of said intermediate layer comprises from about 6 to about 18 parts by weight per 100 parts by weight of total polymer in said intermediate layer.

14. A foam laminate according to claim 1 wherein said at least one additional polymer in said intermediate layer comprises from about 6 to about 27 parts by weight per 100 parts by weight of total polymer in said intermediate layer.

15. A foam laminate according to claim 1 wherein said at least one additional polymer in said intermediate layer comprises from about 7 to about 24 parts by weight per 100 parts by weight of total polymer in said intermediate layer.

16. A foam laminate according to claim 1 wherein the vinyl ester content of said ethylene-vinyl ester is said intermediate layer is from about 9% to about 40% by weight.

17. A foam laminate according to claim 1 wherein the vinyl ester in said intermediate layer content of said ethylene-vinyl ester is from about 12% to about 30% by weight.

18. A foam laminate according to claim 1 wherein said top layer contains one or more chlorinated polyethylenes having a chlorine content of from about 36% to about 46% by weight.

19. A foam laminate according to claim 1 wherein said top layer contains polycaprolactone in an amount of from about 0.5% to about 5% by weight based on the total polymer weight in said top layer.

20. A foam laminate according to claim 1 wherein said top layer contains polycaprolactone in an amount of from about 0.2% to about 4% by weight based on the total polymer weight in said top layer.

21. A foam laminate according to claim 1 wherein said at least one polymer in said bottom layer is uncrosslinked and has a bulk density of from about 300 to about 700 kg/m$^3$.

22. A foam laminate according to claim 1 wherein said at least one polymer in said bottom layer is uncrosslinked and has a bulk density of from about 320 to about 500 kg/m$^3$.

23. A foam laminate according to claim 1 wherein said at least one polymer in said bottom layer is crosslinked and has a bulk density of from about 30 to about 300 kg/m$^3$.

24. A foam laminate according to claim 1 wherein said at least one polymer in said bottom layer is crosslinked and has a bulk density of from about 35 to about 280 kg/m$^3$.

25. A process for preparing a delamination resistant foam laminate, comprising:

joining a top layer, a bottom layer and an intermediate layer without the use of additional adhesives using joining means selected from the group consisting of pressing, rolling, coextrusion and combinations thereof; and heating the laminate during said joining step;

wherein said top layer comprises an unfoamed layer having a thickness of greater than about 20 μm and comprising a styrene-acrylonitrile copolymer grafted with at least one polyfunctional acrylate and containing at least one additional polymer selected from the group consisting of chlorinated polyethylenes, ethylene-propylene mixed polymers and a terpolymer of ethylene, propylene and a diene, the weight ratio of said grafted styrene-acrylonitrile copolymer to said at least one additional polymer being from about 8:2 to about 3:7;

wherein said bottom layer comprises a polyolefin which includes at least one polymer selected from the group consisting of closed pore polyethylene foams and closed pore ethylene-propylene copolymer foams, the bulk density of said bottom layer being greater than 10 kg/m$^3$; and wherein said intermediate layer comprises a mixture of a polar group-containing low pressure polyethylene, a polar group-containing ethylene-vinyl ester copolymer and at least one additional polymer selected from the group consisting of rubberlike ethylene-propylene mixed polymers and rubber-like terpolymers of ethylene, propylene and a diene.

26. A process according to claim 25, wherein said process includes the step of extruding said top layer through a sheet die and wherein said joining step is performed at a temperature of from about 180° C. to about 260° C.

27. A process according to claim 26, wherein said intermediate layer is joined with one of said top and said bottom layers separately to form a two-layer laminate, and two-layer laminate thereafter joined to the other of said top and bottom layers at a temperature of from about 130° C. to about 250° C. and by joining means selected from pressing and at least one pair of rolls.

28. A process according to claim 27, wherein said two-layer laminate is joined to said other layer at a temperature of from about 140° C. to about 190° C. by means of pressing.

29. A process according to claim 25, wherein said joining means comprises coextrusion of said top, bottom and intermediate layers at a temperature of from about 180° C. to about 260° C., said coextrusion utilizing a sheet die.

30. A process according to claim 29, wherin said coextrusion temperature is from about 200° C. to about 240° C.

* * * * *